United States Patent [19]

Cheng et al.

[11] Patent Number: 5,278,108
[45] Date of Patent: Jan. 11, 1994

[54] NEUTRAL GRAY GLASS COMPOSITION

[75] Inventors: J. Joseph Cheng, Perrysburg, Ohio; Brian M. Kolkowski, Fairfax, Va.

[73] Assignee: Libbey-Owens-Ford Co., Toledo, Ohio

[21] Appl. No.: 909,086

[22] Filed: Jul. 2, 1992

[51] Int. Cl.$^5$ ............................................. C03C 3/087
[52] U.S. Cl. ..................................................... 501/71
[58] Field of Search ........................ 501/71, 70, 68, 69

[56] References Cited

U.S. PATENT DOCUMENTS

| | | | |
|---|---|---|---|
| 2,900,264 | 8/1959 | Brown | 501/71 |
| 4,101,705 | 7/1978 | Fischer et al. | 428/220 |
| 4,104,076 | 8/1978 | Pons | 106/52 |
| 4,339,541 | 7/1982 | Dela Ruye | 501/71 |
| 5,023,210 | 6/1991 | Krumwiede et al. | 501/71 |
| 5,030,593 | 7/1991 | Heithoff | 501/72 |
| 5,070,043 | 12/1991 | Amundson et al. | 501/3 |
| 5,070,048 | 12/1991 | Boulos et al. | 501/71 |
| 5,190,896 | 3/1993 | Pucilowski et al. | 501/64 |

Primary Examiner—Mark L. Bell
Assistant Examiner—A. Wright
Attorney, Agent, or Firm—Marshall & Melhorn

[57] ABSTRACT

A neutral, gray colored, nickel having a medium visible light transmittance between about 30 and percent, and low total solar energy and ultraviolet radiation transmittance, is produced with colorants comprising 0.40 to 0.58 percent by weight total iron expressed as $Fe_2O_3$ (22 to 26 percent reduced to FeO), 0.006 to 0.018 $Co_3O_4$, and 0.0006 to 0.0015 percent Se. The glass product having such a composition is particularly suitable for architectural applications.

11 Claims, No Drawings

NEUTRAL GRAY GLASS COMPOSITION

FIELD OF THE INVENTION

The present invention relates generally to a neutral gray colored glass composition, produced using no nickel and small amounts of selenium and cobalt, having an Illuminant C visible light transmittance between about 30 and 40 percent, an ultraviolet radiation transmittance less than about 35 percent, and a total solar energy transmittance below about 35 percent. Preferably, the glass exhibits a visible light transmittance between about 30 and 38 percent, an ultraviolet transmittance less than about 33 percent, and a total solar energy transmittance below about 33 percent. The preferred glass has a narrowly defined dominant wavelength and color purity. The present invention is particularly suitable for producing architectural glazings.

BACKGROUND OF THE INVENTION

This invention involves what would be considered a dark, neutral gray colored glass having a medium level visible light transmittance, i.e., in the range between 30 and 40 percent, a low ultraviolet radiation transmittance, and a low total solar energy transmittance. Although not limited to a particular use, the glass of this invention exhibits a combination of properties that make it highly desirable for use in architectural applications. These properties include a medium level visible light transmittance, low enough to reduce glare and yet high enough to allow adequate visibility therethrough, low total solar energy transmittance to reduce heat gain in the interior of the enclosure, low ultraviolet transmittance to reduce the adverse effects of ultraviolet radiation, a neutral gray color to facilitate coordination with a wide range of interior and exterior colors, and a composition compatible with conventional flat glass manufacturing methods. It is also considered to be an advantage of the invention that all compositions are nickel-free.

In the following discussion, certain terms well known to those skilled in the art are used to describe color in glass. Two terms or specifications for color, dominant wavelength and excitation purity, are derived from tristimulus values that have been adopted by the International Commission on Illumination. The numerical values of these two specifications for a given glass color can be determined by calculating the trichromatic coefficients, x, y and z, from the so-called tristimulus values (X,Y,Z) of that glass color. The trichromatic coefficients x and y then are plotted on a chromaticity diagram and numerically compared with the coordinates of Illuminant C, an established standard light source. (The trichromatic coefficient z value can be obtained by adding x and y and subtracting the total from 1.0) This comparison provides the color space position on the diagram to ascertain the excitation purity and dominant wavelength of the glass color.

Thus, a glass color may be specified either by its coefficients x and y or by its dominant wavelength and purity values. The lower the excitation purity of a color, the closer it is to the Illuminant C standard and the closer it is to being a so-called neutral color which does not distort the hues of objects seen through it.

An understanding of the foregoing terms and definitions thereof may be had by referring to the Handbook of Colorimetry prepared by the staff of the Color Measurement Laboratory, Massachusetts Institute of Technology. This book was printed in 1936 by the Technology Press, Massachusetts Institute of Technology, Cambridge, Mass. Also, a good explanation and list of definitions is given in Color in Business, Science and Industry, (3 Ed.) John Wiley & Sons (especially pages 170-72, 377-78). Useful also is An Introduction to Color, John Wiley & Sons (especially pages 105-106).

Those skilled in the art know that dominant wavelength, purity and light transmission all vary unpredictably with one another. Consequently, developing a new glass composition having a particular color, purity and light transmission value may be difficult. For example, an experimental change in the amount or relative proportions of one or more colorants in a glass composition intended to bring one of these numerical values closer to a target value may cause one or both the other values to drift off target.

In U.S. Pat. No. 3,296,004 to Duncan, neutral brown or bronze heat absorbing glasses are disclosed. Duncan expressly notes that the development of the particular color required a careful consideration of the transmittance characteristics of the glass and that the amounts of the colorants must be carefully controlled to achieve the desired color (dominant wavelength and excitation purity), transmittance and heat-absorbing characteristics. Thus, for example, Duncan points out that if his glass contained more cobalt oxide than he specifies, the color would be more blue than desired. Considering the glass composition of the present invention for a moment, however, the great unpredictability of this area of technology is well demonstrated by the fact that the present invention employs cobalt oxide in an amount well within the range used by Duncan, yet achieves a gray, not a brown or bronze color.

U.S. Pat. No. 3,723,142 to Kato discloses a neutral gray colored, heat absorbing glass having relatively high visible and solar transmittance values of from 57 to 63 percent, and a low excitation purity. The glass is defined as consisting essentially of the following base components in percent by weight: 68–75% $SiO_2$, 0–5% $Al_2O_3$, 5–15% CaO, 0–10% MgO, the sum of the CaO and the MgO being 6–15%, 10–18% $Na_2O$, 0–5% $K_2O$, the sum of the $Na_2O$ and the $K_2O$ being 10–20%, together with coloring components of 0.1–0.5% $Fe_2O_3$, 0.003–0.02% $Co_3O_4$, 0.0005–0.001% Se, and negligible NiO. The specification of the patent states that the quantity of NiO should be less than about 0.002% and preferably less than 0.0004%.

U.S. Pat. No. 4,866,010 to Boulos, et al. discloses a blue glass having a relatively high visible light transmittance of about 54 percent and a dominant wavelength of about 482 nm and a high color purity of about 13 percent. The glass contains from 0.3 to 0.6 percent $Fe_2O_3$, 0.004 to 0.008 $Co_3O_4$, and a relatively small amount of selenium in an amount of from 0.0001 to .001 percent. Again, the great unpredictability of this area of technology is well demonstrated by the fact that the present invention employs cobalt oxide in an amount well within the range used by Boulos, et al., yet achieves a gray, not a blue color.

U.S. Pat. No. 4,873,206 to Jones discloses a dark gray soda-lime silica glass having a low visible light transmittance of less than 20 percent, produced with a relatively high amount of iron (greater than 0.55 percent by weight), and a relatively high amount of selenium (greater than 0.003 percent). The glass product is suitable for use in sun roofs, but is too dark for many architectural applications requiring a higher visible light transmittance. In addition, because of the high volatility and consequently low retention rates of selenium in the glass (typically on the order of about 20 percent), a relatively large quantity of selenium must be added to the batch, much of which escapes to the atmosphere as a pollutant, in order to obtain the levels of selenium disclosed.

U.S. Pat. No. 5,023,210 to Krumwiede et al. also discloses a dark gray soda-lime silica glass having a low visible light transmittance of less than 20 percent, produced with from about 0.4 to, 0.7 percent by weight total iron, of which 15 to 20 percent is in the ferrous state, a relatively high amount of selenium, namely, greater than 0.003 weight percent, from 0.003 to 0.025 percent by weight CoO, and from 0.022 to 0.050 percent by weight $Cr_2O_3$. It would be desirable to be able to make a dark, neutral gray, nickel-free glass, compatible with commercial flat, e.g., float, glass manufacturing techniques, having a medium level visible light transmittance between about 30 and 40 percent, and low ultraviolet radiation and total solar energy transmittance. In this respect, the above discussed dark grey glasses of the prior art are too dark for many architectural applications and indeed are generally only suitable for use in sun roofs.

SUMMARY OF THE INVENTION

It has been discovered, and the present invention is based upon such discovery, that by adding particular quantities of $Fe_2O_3$, selenium and $Co_3O_4$ to conventional float glass compositions, a nickel-free glass composition may be produced having a neutral gray color, medium level visible light transmittance, and low ultraviolet and total solar transmittance*.

* Radiation transmittance results are based upon the following wavelength ranges:
Ultraviolet 300-400 nanometers
Visible 400-770 nanometers
Total Solar 300-2130 nanometers The glass of the present invention has a standard soda-lime-silica flat glass base composition and avoids constituents that cause difficulty in manufacturing such as chromium and manganese. It has been found that a neutral gray glass having an Illuminant C visible light transmittance between about 30 and 40 percent, preferably between about 30 and 38 percent, with lower ultraviolet and total solar transmittance values than any known prior art glasses having comparable visible light transmittance values, can be produced using only iron, cobalt, and selenium as the colorants in the following ranges:

| | Weight Percent of Total Glass | |
|---|---|---|
| Component | Range | Preferred Range |
| $Fe_2O_3$ (total iron*) | .40–.58 | .48–.52 |
| % reduction of total iron | 20–28 | 22–26 |
| Se | .0006–.0015 | .0008–.0012 |
| $Co_3O_4$ | .006–.018 | .007–.012 |

*It is common in the glass industry to refer to the total iron contained in a glass composition or batch as "total iron expressed as $Fe_2O_3$". When a glass batch is melted, however, some of this amount of total iron is reduced to FeO, while the rest remains $Fe_2O_3$. For this reason, it shall be understood that by "total iron expressed as $Fe_2O_3$" is meant the total weight of iron contained in the glass batch before reduction. Further, when reduced to FeO, $Fe_2O_3$ will produce not only FeO, but oxygen gas. This loss of oxygen will decrease the combined weight of the two iron compounds. Therefore, the combined weight of FeO and $Fe_2O_3$ contained in a resulting glass composition will be less than the batch weight of the total iron expressed as $Fe_2O_3$.

At 0.250 inch (6.35 millimeter) the glass of the present invention exhibits a luminous transmittance (C. I. E. Illuminant C) between about 30 and 40 percent and preferably between 30 and 38 percent, ultraviolet transmittance of less than about 35 percent, preferably less than about 33 percent, and total solar energy transmittance of less than about 35 percent, preferably less than about 33 percent.

The glass compositions of the present invention are particularly suitable for the production of gray architectural lo glass, in which it is desirable in many cases to have a medium level visible light transmittance (between about 30 and 40 percent) and low ultraviolet and total solar energy transmittance.

Unless otherwise noted, the term percent (%) as used herein and in the appended claims, means percent (%) by weight. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10} \frac{100}{T} \quad (T = \text{transmission at 1060 nm}).$$

The optical density was then used to calculate the percent reduction:

$$\% \text{ Fe}_{reduced} = \left(\frac{4,331}{D_o}\right) \times \frac{\text{Log}_{10}\left(\frac{92}{\% T_{1060}}\right)}{\% \text{ Fe}_{total}}$$

DETAILED DESCRIPTION

In many architectural glass applications, it is desirable to maintain a certain visible transmittance level, for example between about 30 to 40 percent, to allow for adequate vision therethrough by building occupants. At the same time, it is advantageous to maintain the total solar transmittance and ultraviolet radiation transmittance as low as possible. The higher the total solar transmittance, the higher the heat load will be inside the building, and consequently the higher the load will be on air conditioning systems. Ultraviolet radiation is to be filtered out as much as possible in order to avoid, among other things, degradation of colors in the carpeting and fabrics inside the building.

The batch compositions of the present invention, when used to produce glass having a total glass thickness of about 0.25 inch, can exhibit an Illuminant C visible light transmittance value of between 30 and 40 percent, and preferably between 30 and 38 percent, and provide infrared energy and ultraviolet radiation transmittance values substantially lower than any compositions having similar visible transmittance values disclosed in the prior art. The total solar energy transmittance of the compositions of the present invention, at a total glass thickness of 0.25 inch is less than 0.35 percent. Preferably, the total solar energy transmittance in these thicknesses is less than 33 percent. Total solar energy transmittance is a measure of the solar energy transmittance over all the solar energy wavelengths. It is an integrated term covering the area under the transmittance versus wavelength curve for visible, infrared and ultraviolet energy wavelengths. The ultraviolet radiation transmittance of the compositions of the present invention is less than about 35 percent at a total glass thickness of about 0.25 inch, and generally not more than about 33 percent. The ultraviolet transmittance value is an integrated term representing the area under the transmittance versus wavelength curve for wavelengths between 300 and 400 nanometers. The ultraviolet radiation transmittance values for glass compositions of the present invention were calculated by integrating the Perry Moon air mass 2 solar spectral energy distribution* between 300 and 400 nm, and ratioing the attenuated energy transmitted by the sample over that same spectral region.

*From "Proposed Standard Solar-Radiation Curves for Engineering Use", Perry Moon, M. I. T., Journal of the Franlin Institute, No. 20, pp. 583-617 (1940).

Suitable batch materials according to the present invention, which are compounded by conventional glass batch ingredient mixing devices, include sand, limestone, dolomite, soda ash, salt cake or gypsum, niter, rouge, carbon, selenium and cobalt oxide ($Co_3O_4$). These materials are conveniently melted together in a conventional glass making furnace, to form a gray-colored infrared energy and ultraviolet radiation absorbing glass composition, which thereafter may be continuously cast onto the molten metal bath in a float glass process. The flat glass thus produced is particularly beneficial for use in architectural glazings.

The compositions of soda-lime-silica flat glasses suitable for use in accordance with the present invention typically have the following weight percentage constituents:

| | |
|---|---|
| $SiO_2$ | 68-75% |
| $Na_2O$ | 10-18 |
| CaO | 5-15 |
| MgO | 0-5 |
| $Al_2O_3$ | 0-5 |
| $K_2O$ | 0-5 |

Other minor ingredients, including melting and refining aids such as $SO_3$, may also appear in the glass composition. The coloring constituents of the present invention set forth above are added to this base glass. The glass is essentially free of nickel; that is, no deliberate addition of nickel or nickel compounds is made, although the possibility of traces of nickel due to contamination may not always be avoided. Likewise, the glass is essentially free of colorants other than iron, cobalt, and selenium, and specifically it is essentially free of chromium, titanium, and manganese other than any trace amounts that may be present as impurities. Accordingly, the glass of the present invention may be melted and refined in a conventional tank-type melting furnace and formed into flat glass sheets of varying thicknesses by the float method in which the molten glass is supported on a pool of molten metal, usually tin, as it assumes a ribbon shape and is cooled.

The concentrations of each of the three colorant constituents depend upon the transmittance desired for the glass and are interrelated to each other. Iron is added, typically as $Fe_2O_3$, and is partially reduced to FeO. The total amount of iron in the batch is critical, and must equal from 0.40 percent to about 0.58 percent by weight, expressed as $Fe_2O_3$. Likewise, the degree of reduction is critical and must equal between 20% and 28%. If the iron is more highly reduced than the critical amount, or if a higher total amount of iron is employed, the glass will become too dark and the Illuminant C visible light transmittance will drop (below about 30 percent). Additionally, the glass batch melting process will become increasingly difficult as the increased amount of FeO prevents the penetration of heat to the interior of the melt. If the iron is less reduced than the critical amount, or if a lower total amount of iron is employed, then the total solar energy transmittance for a desired thickness glass can rise (above about 35 percent).

From about 0.006 to about 0.018 weight percent cobalt oxide is added, typically as $Co_3O_4$, along with about 0.0006 to about 0.0015 weight percent selenium. The proper selenium and cobalt content provides an aesthetically pleasing, neutral gray color to the glass.

The invention is more easily comprehended by reference to specific embodiments which are representative of the invention. It must be understood, however, that the specific embodiments are provided only for the purpose of illustration, and that the invention may be practiced otherwise than as specifically illustrated without departing from its spirit and scope.

EXAMPLES

Typical soda-lime-silica glass batch ingredients were mixed, together with rouge, a cobalt containing compound, a carbonaceous reducing agent, and a selenium containing compound, and melted to produce 0.250 inch thick test samples in accordance with the invention. The resultant glass samples are characterized as follows:

TABLE I

| | Ex. 1 | Ex. 2 | Ex. 3 | Ex. 4 |
|---|---|---|---|---|
| Total Iron, as $Fe_2O_3$ (%) | .5 | .425 | .40 | 485 |
| Reduction of Iron to FeO (%) | 24.5 | 24.8 | 26.1 | 25.9 |
| $Co_3O_4$ (%) | .009 | .008 | .008 | .009 |
| Se (%) | .0009 | .0009 | .0009 | .0008 |
| Sample Thickness (in.) | .250 | .250 | .250 | .250 |
| Illuminant C (%) Transmittance | 33.8 | 38.1 | 37.5 | 34.2 |
| Total Solar Transmittance (%) | 29.7 | 34.2 | 34.3 | 29.3 |
| UV Transmittance (%) | 25.9 | 28.7 | 29.8 | 25 |
| Doninant Wavelength (nm) | 490.4 | 490 | 491 | 492 |
| Color Purity (%) | 1.5 | 1.4 | 1.3 | 1.3 |

What I claim is:

1. A neutral gray colored glass composition having a base glass composition comprising:

| | |
|---|---|
| $SiO_2$ | 68-75 percent by weight |
| $Na_2O$ | 10-18 |
| CaO | 5-15 |
| MgO | 0-5 |
| $Al_2O_3$ | 0-5 |
| $K_2O$ | 0-5 | and coloring components consisting essentially of the following metal/metal oxides in the indicated ranges:

| | |
|---|---|
| $Fe_2O_3$ | .40-.58 percent by weight |
| Se | .0006-.0015 |
| $Co_3O_4$ | .006-.018 | whereby 20-28 percent of the iron is in the ferrous state.

2. A neutral gray colored glass as defined in claim 1, wherein said glass at a nominal thickness of about 0.25 inch has an Illunimant C visible light transmittance between about 30 and 40 percent, a total solar energy transmittance below about 35 percent, and an ultraviolet radiation transmittance less than about 35 percent.

3. A neutral gray colored glass as defined in claim 2, wherein said glass at a nominal thickness of about 0.25 inch has an Illuminant C visible light transmittance between about 30 and 38 percent, a total solar energy transmittance below about 33 percent, and an ultraviolet radiation transmittance less than about 33 percent.

4. A neutral gray colored glass as defined in claim 1, wherein said glass at a nominal thickness of about 0.25 inch has an Illuminant C dominant wavelength from about 480 to about 500 nanometers, and a color purity from about 0 to about 3.5 percent.

5. A neutral gray colored glass as defined by claim 4, wherein said glass at a nominal thickness of about 0.25 inch has an Illuminant C dominant wavelength from about 475 to about 500 nanometers, and a color purity from about 0 to about 2.5 percent.

6. A neutral gray colored glass composition having a base glass composition comprising:

| | |
|---|---|
| $SiO_2$ | 68–75 percent by weight |
| $Na_2O$ | 10–18 |
| CaO | 5–15 |
| MgO | 0–5 |
| $Al_2O_3$ | 0–5 |
| $K_2O$ | 0–5 | and coloring components consisting essentially of the following metal/metal oxides in the indicated ranges:

| | |
|---|---|
| $Fe_2O_3$ | .48–.52 percent by weight |
| Se | [.0006].0008–.0012 |
| $Co_3O_4$ | .007–.012 | whereby 22–26 percent of the iron is in the ferrous state.

7. A neutral gray colored glass as defined in claim 6, wherein said glass at a nominal thickness of about 0.25 inch has an Illuminant C visible light transmittance between about 30 and 40 percent, a total solar energy transmittance below about 33 percent, and an ultraviolet radiation transmittance less than about 32 percent.

8. A neutral gray colored glass as defined in claim 6, wherein said glass at a nominal thickness of about 0.25 inch has an Illuminant C visible light transmittance between about 3o and 38 percent, a total solar energy transmittance below about 33 percent, and an ultraviolet radiation transmittance less than about 33 percent.

9. A neutral gray colored glass as defined in claim 6, wherein said glass at a nominal thickness of about 0.25 inch has an Illuminant C dominant wavelength from about 480 to 495 nanometers, and a color purity from about 0.5 to about 2.0.

10. An architectural glazing unit comprising a neutral gray colored glass having a base glass composition comprising in percent by weight 68–75 $SiO_2$, 10–18 $Na_2O$, 5–15 CaO, 0–5 MgO, 0–5 $Al_2O_3$ and 0–5 $K_2O$, and coloring components of from 0.40 to 0.54 total iron, of which 22 to 26 percent of the total iron is reduced to FeO, 0.006 to 0.018 percent $Co_3O_4$, and 0.0006 to 0.0015 percent Se, said glazing having spectral properties such that at a nominal thickness of about 0.25 inch, Illuminant C transmittance is between about 30 and 40 percent, total solar energy transmittance is below about 35 percent, and ultraviolet radiation transmittance is below about 35 percent.

11. An architectural glazing unit comprising a neutral gray colored glass having a base glass composition comprising in percent by weight 68–75 $SiO_2$, 10–18 $Na_2O$, 5–15 CaO, 0–5 MgO, 0–5 $Al_2O_3$ and 0–5 $D_2O$, and coloring components of from 0.48 to 0.52 total iron, of which 22 to 26 percent of the total iron is reduced to FeO, 0.007 to 0.012 percent $Co_3O_4$, and 0.0006 to 0.0012 percent Se, said glazing having spectral properties such that at a nominal thickness of about 0.25 inch, Illuminant C transmittance is between about 30 and 38 percent, total solar energy transmittance is below about 33 percent, and ultraviolet radiation transmittance is below about 33 percent.

* * * * *

UNITED STATES PATENT AND TRADEMARK OFFICE
CERTIFICATE OF CORRECTION

PATENT NO. : 5,278,108

DATED : January 11, 1994

INVENTOR(S) : J. Joseph Cheng and Brian M. Kolkowski

It is certified that error appears in the above-identified patent and that said Letters Patent is hereby corrected as shown below:

On the cover page:

[57] ABSTRACT, line 1, insert -- -free soda-lime-silica glass-- after "nickel"; line 2, "30 and percent" should read --30 and 40 percent--.

In the specification:

Column 1, line 55, insert a period between "1.0" and the closing parenthesis.

Column 3, line 17, begin a new paragraph with "It would be desirable to be able to ...".

Column 4, line 9, delete "lo"; line 59, "0.35" should read --35--; beneath the second formula in Column 4, line 33, insert the following:

-- 1. Glass thickness ($D_o$) in <u>inches</u> → <u>4.33</u> = 110/25.4

2. Optical density is corrected for <u>reflection losses</u> → <u>92</u>/%T--

Column 6, line 32, under Table I, "485" should read --.485--.

In the claims:

Claim 6, column 7, line 40, delete "[.0006]".

UNITED STATES PATENT AND TRADEMARK OFFICE
CERTIFICATE OF CORRECTION

| | |
|---|---|
| PATENT NO. : | 5,278,108 |
| DATED : | January 11, 1994 |
| INVENTOR(S) : | J. JOseph Cheng and Brian M. Kolkowski |

It is certified that error appears in the above-indentified patent and that said Letters Patent is hereby corrected as shown below:

Claim 11, column 8, line 34, "$D_2O$" should read --$K_2O$--.

Signed and Sealed this

Twenty-second Day of November, 1994

Attest:

BRUCE LEHMAN

Attesting Officer

Commissioner of Patents and Trademarks